United States Patent [19]

Boersen

[11] Patent Number: 5,064,501
[45] Date of Patent: Nov. 12, 1991

[54] SPRAY DRYING APPARATUS; METHOD FOR PREPARATION OF A SPRAY-DRIED PRODUCT HAVING A DESIRED BULK DENSITY

[75] Inventor: Antonius C. Boersen, Hillegom, Netherlands

[73] Assignee: Stork Friesland B.V., Netherlands

[21] Appl. No.: 492,998

[22] Filed: Mar. 13, 1990

[30] Foreign Application Priority Data

Mar. 13, 1989 [NL] Netherlands ........................ 8900598

[51] Int. Cl.[5] .......................... B05B 1/02; B05D 1/02; B29B 9/08

[52] U.S. Cl. .............................. 159/4.08; 23/313 FB; 118/303; 159/48.1; 264/37; 264/117; 427/212; 427/213

[58] Field of Search ...................... 159/4.01, 4.08, 4.4, 159/48.1; 427/212, 213; 34/10, 57 R; 23/313 R, 313 FB; 426/471; 118/303; 264/117, 37

[56] References Cited

U.S. PATENT DOCUMENTS

| | | | |
|---|---|---|---|
| Re. 29,647 | 5/1978 | Veltman et al. | 159/4.01 |
| 1,830,174 | 11/1931 | Peebles | 159/4.01 |
| 2,575,119 | 11/1951 | Peebles et al. | 159/4.01 |
| 2,698,815 | 1/1955 | Bishop | 159/4.01 |
| 3,042,526 | 7/1962 | Spiess, Jr. et al. | 34/10 |
| 3,615,723 | 10/1971 | Meade | 426/294 |
| 3,621,902 | 11/1971 | Okada et al. | 159/4.01 |
| 4,352,118 | 10/1982 | Grün | 159/4.01 |
| 4,501,773 | 2/1985 | Nioh et al. | 427/213 |

*Primary Examiner*—Mary Lynn Theisen
*Attorney, Agent, or Firm*—Hurt, Richardson, Garner, Todd & Cadenhead

[57] ABSTRACT

Described is a device for obtaining a foam spray-dried product of predetermined bulk density. Thereto a nozzle for spraying a foaming gas comprising liquid is surrounded by a tube for supplying a gas which comprises dry particulate material to the jet of nozzle.

Means are present to accurately control the ratio of solids in the liquid to be sprayed and the dry particulate material.

The method described that the dry particulate material is made to collide with the jet from the nozzle and that the speed of the gas transporting said dry material is lower than 20 m/sec and preferably from 6 to 12 m/sec.

13 Claims, 1 Drawing Sheet

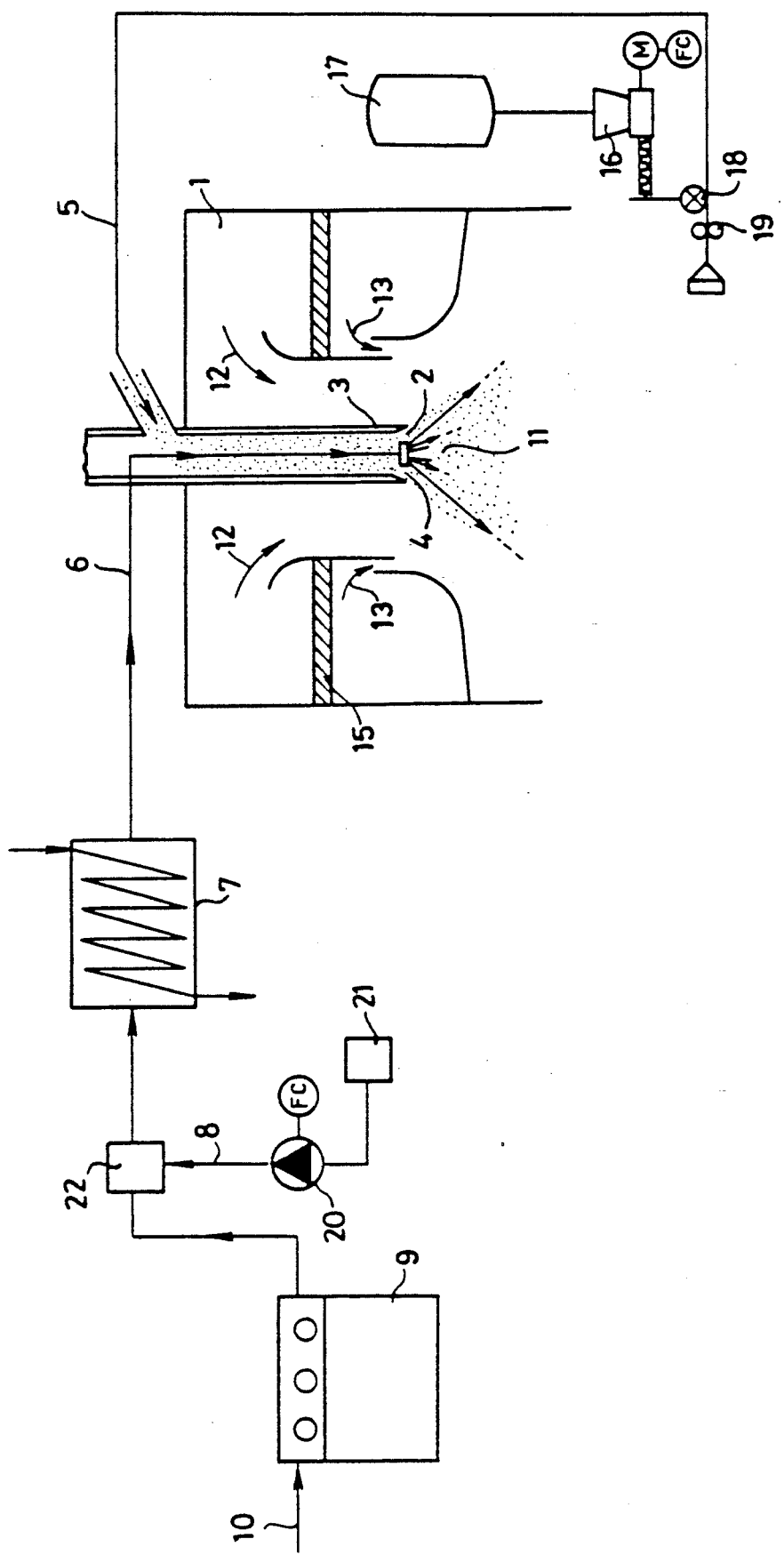

SPRAY DRYING APPARATUS; METHOD FOR PREPARATION OF A SPRAY-DRIED PRODUCT HAVING A DESIRED BULK DENSITY

BACKGROUND OF THE INVENTION

The invention first relates to an apparatus for the preparation of a foam spray-dried product at least comprising a housing and a nozzle situated therein, in which the nozzle connects to a conduit for supplying liquid comprising at least one of the ingredients of the end product and a supply of pressurized gas being connected to said conduit and means are provided to feed a stream of gas comprising a dry particulate material to the jet of droplets issued by the nozzle concerned.

Such an apparatus is known from U.S. Pat. No. 3,615,723. In said publication a spray drying apparatus is described in which to facilitate the drying operation and to reduce the density of the finished product the liquid which is fed to the nozzle may be supplied with air or any suitable gas. The thus formed droplets expand under influence of the gas present and are subsequently brought into contact with a dry particulate material in order to form agglomerates between the still moist expanded droplets and the dry particular material.

The axis of the jet of moist expanded droplets and the jet of dry particulate material are substantially perpendicular to each other. The agglomerated dried product obtained in this way will show non-uniform properties which is undesirable.

The present invention has an object to provide an apparatus of the above indicated type with which it is possible to prepare a very uniform product.

A further object of the present invention is to provide an apparatus with which a uniform product may be prepared which additionally enables to prepare a product of any desired bulk density.

SUMMARY OF THE INVENTION

The apparatus of the type described is in order to achieve above objects characterized in that the housing of the apparatus is provided with a tube for feeding-in said stream of gas comprising dry particulate material; said tube ending inside the housing and said nozzle being arranged near the end of said tube whereby the projection of the tube in the direction of the axis thereof is surrounding the projection of the nozzle in the same direction while further means are present which allow for the accurate adjustment of the weight amount of liquid, the weight amount of gas to be supplied to said liquid and the weight amount of dry particulate material to predetermined values in correspondence with a bulk density which is desired for the end product.

It has been found that by feeding-in the dry particulate material in a stream which extends around the nozzle a very uniform product may be obtained of which the particles comprise a dry material in expanded state of the liquid supplied to the nozzle and the dry particulate material which has been fed into a stream surrounding the nozzle. In particular the nozzle is situated substantially in the plane of the end of said tube whereby an open area of ring form is present between the outer circumference of said nozzle and the inner circumference of said tube.

The relative positions of the end of the tube and the nozzle can be varied; advantageously to that end the nozzle may be moved along the axis of the tube ending in the housing.

It has been established that with advantage the ratio between the diameter of the inner circumference of said tube and the outer circumference of said nozzle is between 1.5 and 5.

Preferably the ratio between the diameter of the tube and the diameter of the nozzle is between 0.5 and 2.5 and most preferably said ratio is about 2.

With respect to the invention further NL-A-86 02952 of applicant is mentioned. In said publication a device is described for the preparation of a free flowing fat-comprising product to which a lecithin comprising substance is added. This known device comprises three spray nozzles for fat-comprising concentrate and lecithin comprising substance respectively. Around the supply conduit of the nozzle for the lecithin comprising substance a jacket is arranged through which an airflow is fed comprising recirculating particles of a fine fraction of spray-dried product. The latter assembly of nozzle and jacket shows resemblance with a part of the device according to the invention.

Said publication does not comprise information about the use of such assembly in a device for the preparation of a foam-spray-dried product in which, apart from an element which shows resemblance to said assembly, means are provided for the dosed supply of product to be sprayed, pressurized and/or liquefied gas and dry particulate material.

With advantage the apparatus according to the invention as described hereinbefore comprises one or more of the following additional devices:

a. A fluid bed which connects to the outlet of the housing of the apparatus having at least a part in which turbulent mixing conditions exist.
b. A powder collection unit, such as a filter, or cyclone with which it is possible to separate fines which may be recirculated to the stream of dry particulate material which is fed into the stream around the nozzle.
c. Means for extracting entrained particles from within the housing which may also be fed into the stream of dry particulate material which is supplied around the nozzle to agglomerate with the expanded droplets of material in wet state issued by the nozzle.

In order to supply the liquid to be sprayed which contains a gas, such as for example carbon dioxide, in a dissolved state preferably heat exchanger is present in the conduit for supplying liquid comprising at least one of the ingredients of the product.

With such a heat exchanger it is possible to adjust the temperature of the solution which contains at least one of the ingredients and dissolved or dispersed gas.

The invention also relates to a method of preparation of a spray-dried product in which a solution of at least one of the ingredients of the product is fed to a nozzle within a housing whereby a pressurized gas is fed to said solution to cause a foaming of said solution leaving the nozzle as a jet of droplets and whereby a stream of gas comprising a dry particulate material is fed to the jet of droplets.

According to the invention the method of the type described is characterized in that the stream of gas comprising a dry particulate material is made to collide with the jet of droplets issued by the nozzle and whereby at least at the intersection of said stream and said jet of droplets the cross-section of said stream has a ring form whereby the axis of the jet of droplets is substantially perpendicular to the plane of such ring and wherein the ratio between the amount of dry particulate material and the amount of solution fed to the nozzle is adjusted to achieve a desired bulk density for the spray-dried product.

By using the device with respect to the invention's described dosing means for liquid having at least one of the components of the end product; foaming gas and dry particulate material the bulk density of the spray-dried product is adjustable at wish. The range of bulk density adjustment comprises the bulk density of the foamed dry substance from the supplied liquid to the bulk density of the dry particulate material.

It has been found that by feeding-in a stream of gas comprising dry particulate material in a ring form whereby said stream is made to collide with the jet of droplets issued by the nozzle it is possible to obtain a very uniform agglomerated material; by adjustment of the ratio between the amount of dry particulate material and the amount of solution which is fed to the nozzle it has been found possible to achieve a bulk density of the end product which has a predetermined desired value.

In particular an optimal agglomeration is achieved by use of a spraying pressure between 20 and 400 bar, preferably between 50 and 150 bar, whereas a velocity of the gas stream in ring form in the vicinity of the nozzle is at most 20 m/sec, preferably between 6 and 12 m/sec.

In experiments it has been observed that the velocity of the air which is carrying the dry components expediently will be not too high; if this is the case the dry particles will pass through the spray mist and not agglomerate. The end product will be insufficiently agglomerated in such case.

It has been found that the air velocity in the vicinity of the nozzle has to be maximally 20 m/sec at normal operation and preferably lower than 12 m/sec. The air-cooled housing having therein arranged the nozzle therefore has to be given accurately determined dimensions as indicated hereinbefore.

The dry particulate material may be chosen from dry ingredients constituting the remainder of the end product ingredients in not foamed condition; fines obtained after drying of the agglomerated product and classifying such as sieving, and recirculated particles which are entrained in the upward gas stream inside the housing or combinations thereof.

In general the particulate material will be composed of all three of above-mentioned possible constituents, whereby in any case the dry particulate material in not foamed condition is present.

It is to be noted that the above indicated dry ingredients constituting the remainder of the end product ingredients of course can also be equal to the product ingredients. In other words a spray-dried product may be prepared by spraying a liquid comprising an ingredient in dissolved state and by feeding-in as dry particulate material a dry product which is identical to the product which is present in the liquid to be sprayed in dissolved state.

Optionally the product obtained after removing of the fines may be conditioned in, for example, a packed bed to lower the moisture content to a desired degree.

The hereinbefore described apparatus and method according to the invention are in particular useful to prepare particles consisting of hollow spheres comprising dry particulate material, whereby the dry particles internally or externally are connected to the hollow spheres.

The products may be obtained in any desired density between a low density corresponding to the density of the foamed product having no dry ingredients incorporated and a high density of the dry component in not foamed condition.

BRIEF DESCRIPTION OF THE DRAWING

The invention now will be illustrated by means of the drawing having one single figure which shows an apparatus for preparation of a spray-dried product according to the invention.

In the figure a housing is indicated by reference number 1 which housing accommodates a nozzle 2 and a tube 3 ending inside said housing. The tube is arranged such that the tube end encloses the nozzle; the nozzle is arranged such that it is centered around the axis of the tube 3 whereas the nozzle lies in the plane in which also the end of the tube 3 within the housing is situated adjustable. To achieve an optimal uniformity of the product the nozzle 2 is mounted adjustably. The nozzle may move along the axis of tube 3. To the tube 3 is fed a stream 5 of dry particulate material. To the nozzle is fed a solution of material to be spray-dried, to which liquid at 8 a stream of compressed gas such as $CO_2$ or $N_2$ is fed. The solution which is under pressure is heated in heat exchanger 7 to a temperature which is desired for the spraying operation in the nozzle. With 9 a high pressure pump is schematically indicated whereas the supply of liquid which at least contains one of the ingredients of the end product is indicated with 10. The nozzle 2 ejects a jet 11 of expanded droplets of the liquid fed to the nozzle 2 to which a stream of dry particulate material 5 collides which is supplied via the opening 4 of ringform which is present between the outer circumference of the nozzle 2 and the inner circumference of the tube 3.

Dosing of dry particulate material via conduit 5 may be achieved with use of a pneumatic pressurized air system 19 to which with use of a dosing unit 16 for dry powder a desired quantity of dry powder is supplied via a lock system 18.

Dosing of the gas used for foaming, such as for example $CO_2$ is carried out with a dosing unit 20 from a storage vessel 21. The gas-flow 8 is with use of an impregnating and mixing unit 22 combined with the flow of concentrate from the high pressure pump 9 to which the liquid 10 to be sprayed is fed.

In the drawing is indicated that the housing 1 comprises only one nozzle 2 and one tube 3. In order to increase the capacity of the apparatus of course a suitable housing can accommodate more than one assembly of a nozzle and a surrounding tube. In the figure a partition wall 15 is indicated which forms a division between the hot gas stream 12 coming from the top of the housing via an opening not shown and a stream of cold air 13 which enters the housing via an opening that has neither been shown. The stream of cold air 13 has as a purpose to cool the roof of the housing 1. The volume flow of cold air generally is only a fraction of the volume flow of hot air.

The invention will now be illustrated with a number of not limiting examples wherein all percentages are weight percentages unless indicated otherwise.

EXAMPLE I

A 67% solution of sucrose is mixed with $CO_2$ and sprayed under pressure in a device according to the invention. The sprayed solution volume is kept constant. Crystalline sucrose is dosed accurately as a dry powder. The bulk density of the end product may be adjusted as desired with use of the ratio of the solids weight of the solution and the weight of crystalline sucrose which are fed in per unit of time.

The bulk density of crystalline sucrose is 700 g/l. Per kg sucrose-solution 3.5 g $CO_2$ is added.

| Fraction sucrose-solids in solution % | Fraction crystalline sucrose % | Bulk density (100 taps) g/l |
|---|---|---|
| 99.5 | 0.5 | 180 ± 10 |
| 70 | 30 | 320 ± 10 |
| 65 | 35 | 350 ± 10 |
| 30 | 70 | 590 ± 10 |

EXAMPLE II

A mixture of a plant-extract and a fat-comprising creamer is partly foam-spray-dried and partly added in dry form to the device according to the invention. The end product bulk density is adjusted by adjusting the weight ratio between the two components. The solids content of the solution was 55%; per kg solution 11 g $CO_2$ is added.

| Fraction solution solids % | Fraction solids dry material % | Bulk density (100 taps) g/l |
|---|---|---|
| 99 | 1 | 150 ± 10 |
| 38 | 62 | 380 ± 10 |
| 22 | 78 | 410 ± 10 |

EXAMPLE III

A solution of 52% malto dextrine is sprayed under foaming with a fixed quantity of 4.5 g $CO_2$ per kg solution. Crystalline lactose was fed to the spray zone as a dry powder.

The bulk density of the end product may be adjusted as follows:

| Fraction solution solids % malto dextrine | Fraction solids dry lactose % | Bulk density (100 taps) g/l |
|---|---|---|
| 99 | 1 | 100 ± 10 |
| 75 | 25 | 110 ± 10 |
| 50 | 50 | 210 ± 10 |
| 25 | 75 | 310 ± 10 |

Bulk density crystalline lactose: 700 g/l.

In all examples the air speed in the gas flow of ring form around the nozzle was about 9 m/sec.

In the first example an experiment was included to check the influence of the air speed around the nozzle.

| Fraction solution solids sucrose % | Fraction dry sucrose % | V air m/sec | Bulk density product g/l | Fraction product % <315 μm |
|---|---|---|---|---|
| 80 | 20 | 8.5 | 275 ± 10 | 20 |
| 80 | 20 | 14 | 315 ± 10 | 55 |

Herefrom appears that at an air speed higher than the preferred range of 6–12 m/sec as indicated the dry particles pass the spray and do not agglomerate sufficiently. This leads to an increase in bulk density and an increase of the fraction of particles having a dimension <315 μm.

What is claimed is:

1. Apparatus for the preparation of a foam spray-dried product at least comprising a housing and a nozzle situated therein, in which the nozzle connects to a conduit for supplying liquid comprising at least one of the ingredients of the end product and a supply of pressurized gas and/or liquified gas being connected to said conduit, said liquid forming a jet of droplets as it passes through the nozzle, and means are provided to feed a stream of gas comprising dry particulate material to the jet of droplets issued by the nozzle concerned, in which the housing is provided with a tube for feeding in said stream of gas comprising dry particulate material; said tube ending inside the housing and said nozzle being mounted adjustably within said tube and capable of moving along the axis of said tube whereby said stream of gas comprising dried particulate material is ejected from said tube within said housing and said liquid is ejected from said nozzle substantially co-directionally with said stream of gas, while further means are present which allow for the accurate adjustment of the weight amount of liquid; the weight amount of gas to be supplied to said liquid and the weight amount of dry particulate material to predetermined values in correspondence with a bulk density which is desired for the end product.

2. Apparatus according to claim 1, in which the nozzle is situated substantially in the plane of the end of said tube whereby an open area of ring form is present between the outer circumference of said nozzle and the inner circumference of said tube.

3. Apparatus according to claim 2, in which the ratio between the cross-section of the inner circumference of said tube and the outer circumference of said nozzle is between 1.5 to 5.

4. Apparatus according to claim 3, in which said ratio is between 1.5 and 2.5.

5. Apparatus according to claim 1, in which for drying purposes a fluid bed connects to the outlet of the housing having at least a part in which turbulent mixing conditions exist.

6. Apparatus according to claim 5, in which a powder collection unit is present which connects to the outflow of the fluidized bed to separate fines whereby recirculating means are provided to add these fines to the stream of gas which is fed to the tube which ends in the housing to form part of the dry particulate material contained in said stream.

7. Apparatus according to claim 1, in which means are provided to extract entrained particles from within the housing and to feed these particles to the stream of gas which is fed to the tube which ends in the housing to form part of the dry particulate material contained in said stream.

8. Apparatus according to claim 1, in which a heat exchanger is included in the conduit for supplying liquid comprising at least one of the ingredients of the product.

9. Method of preparation of a foam spray-dried product in which a solution of at least one of the ingredients of the product is fed to a nozzle within a housing whereby a pressurized gas is fed to said solution to cause a foaming of said solution leaving the nozzle as a jet of droplets and whereby a stream of gas comprising a dry particulate material is fed to the jet of droplets, in which the stream of gas comprising a dry particulate material is made to collide with the jet of droplets issued by the nozzle and whereby at least at the intersection of said stream and said jet of droplets the cross-section of said stream has a ring form whereby the axis of the jet of droplets is substantially perpendicular to the plane of such ring and wherein the ratio between the amount of dry particulate material and the amount of solution fed to the nozzle is adjusted to achieve a desired bulk density for the spray-dried product.

10. Method according to claim 9, in which in order to achieve an optimal agglomeration between the droplets leaving the nozzle and the dry particulate material of the gas stream of ring form a spraying pressure between 20 and 400 bar is used and a velocity of the gas stream of ring form in the vicinity of the nozzle of at most 20 m/sec.

11. Method according to claim 10, in which a spraying pressure is used between 50 and 150 bar and a velocity of the gas stream of ring form between 6 and 12 m/sec.

12. Method according to claim 9, in which the dry particulate material at least comprises dry ingredients constituting the remainder of the end product in not foamed condition and further is chosen from fines obtained after drying in a fluidized bed, of which bed at least a part is in a turbulent condition, and classifying, and recirculated particles which are entrained in an upward gas stream inside the housing.

13. Method according to claim 9, in which the product, after sieving out the fines is conditioned in a packed bed to lower the moisture content to a desired degree.

* * * * *